(12) United States Patent
Frigo

(10) Patent No.: US 6,222,654 B1
(45) Date of Patent: Apr. 24, 2001

(54) OPTICAL NODE SYSTEM FOR A RING ARCHITECTURE AND METHOD THEREOF

(75) Inventor: Nicholas J. Frigo, Atlantic Highlands, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 08/905,879

(22) Filed: Aug. 4, 1997

(51) Int. Cl.[7] ................................................. H04J 14/02
(52) U.S. Cl. ........................ 359/119; 359/128; 359/125
(58) Field of Search ................................... 359/119, 125, 359/134, 152, 127, 177

(56) References Cited

U.S. PATENT DOCUMENTS

| | | | |
|---|---|---|---|
| 5,436,750 | * 7/1995 | Kawano | 359/177 |
| 5,440,418 | * 8/1995 | Ishimura et al. | 359/177 |
| 5,488,500 | * 1/1996 | Glance | 359/127 |
| 5,535,037 | * 7/1996 | Yoneyama | 359/177 |
| 5,774,244 | * 6/1998 | Tandem et al. | 359/125 |
| 5,796,501 | * 8/1998 | Sotom et al. | 359/119 |
| 5,815,295 | * 9/1998 | Darcie et al. | 359/128 |
| 6,023,366 | * 2/2000 | Kinoshita | 359/341 |

OTHER PUBLICATIONS

Pat. No. 5,559,624, filed on Nov. 3, 1994 and issued on Sep. 24, 1996 to T.E. Darcie; N. J. Frigo; and P.D. Magil.

* cited by examiner

Primary Examiner—Leslie Pascal
Assistant Examiner—Dalzid Singh
(74) Attorney, Agent, or Firm—Allen, Dyer, Doppelt, Milbrath & Gilchrist, P.A.

(57) ABSTRACT

An optical node system for an optical ring network reduces certain costs associated with current ring architectures by using at least a portion of the light from an incoming optical signal to transmit an outgoing optical signal. In accordance with certain embodiments, the node includes an optical multiplexer which receives optical signals having a plurality of wavelengths. The optical multiplexer can be configured to output optical signals having certain wavelengths and to route at least one optical signal from the ring of at least one particular wavelength (or wavelength band) to a corresponding optical transceiver. The optical transceiver receives the incoming optical signal of the particular wavelength routed from the optical multiplexer and transmits at least a portion of the light from the incoming optical signal having the particular wavelength. The optical transceiver can modulate user information onto the light of the particular wavelength and/or pass at least a portion of the incoming optical signal for transmission as an outgoing optical signal onto the optical ring network. Thus, the optical node system alleviates the need for nodes to have a laser tuned to the particular wavelength for transmitting an outgoing optical signal having the particular wavelength.

21 Claims, 6 Drawing Sheets

OPTICAL NODE SYSTEM FOR A RING ARCHITECTURE AND METHOD THEREOF

BACKGROUND OF THE INVENTION

1. Field of the Invention

The present invention relates to an optical ring architectures in general and, more particularly, to an optical node system for an optical ring architecture.

2. Description of the Related Art

Fiber optic systems have increasingly taken over the functions of their copper counterparts in the trunk network and between central offices due to their inherent low loss and high bandwidth. A typical central office ring configuration 100 is depicted in FIG. 1 and includes a plurality of central offices 101a–d. Each central office (CO) 101a–d is capable of transmitting calls to any of the other COs, either directly via direct connections 103a–d or indirectly through other COs as shown by logical connections 105a–b.

Typically, a CO 101a includes an add/drop multiplexer (not shown) which adds calls to the ring 103a–d destined for another CO 101b–d or drops calls from the ring 103a–d for the CO 101a.

FIG. 2 depicts a more detailed diagram of a ring architecture 106 of COs 101a–c. As shown, each CO 101a–c is capable of receiving and transmitting information over a plurality of optical fibers 107. Typically, each fiber 107 operates at a predetermined optical wavelength or wavelength band, but a single optical fiber 107 could carry traffic having multiple wavelengths. The optical fibers 107 can be unidirectional in either direction or bidirectional. Some of the optical signals on the optical fibers 107 will terminate at the CO 101a–c in that terminal equipment (not shown) in the CO 101a–c converts the optical signal to electronic form, while other optical signals will continue through the ring 106. In a typical example, an optical signal on a path 107 for destination equipment 110 is "dropped" from the ring by an add/drop multiplexer (not shown) in the CO 101a to terminal equipment (not shown) in the CO 101a. The terminal equipment (not shown) in the CO 101a may convert the optical signal to an electrical signal and pass the electrical signal along path 112 to destination equipment 110. The path 112 could be copper lines, and the destination equipment 110 is typically a terminal.

Calls can be "added" to the ring from source equipment for destination equipment 118. Source equipment 114 produces a signal along path 116 to the CO 101a. The path 116 could be copper lines for carrying electrical signals. In the CO 101a, the terminal equipment (not shown) receives the electrical signal and converts it to an optical signal. The add/drop multiplexer (not shown) in the CO 101a receives the optical signal and adds it onto a path 107. The optical signal added is routed along one or more of the paths 107 interconnecting one or more of the other COs 101a–c and is eventually "dropped," for instance, by an add/drop multiplexer (not shown) of the CO 101c which is connected to the destination equipment 118. The add/drop multiplexer (not shown) passes the optical signal to terminal equipment (not shown) in the CO 101c. As described above, the terminal equipment (not shown) in the CO 101c passes the signal along path 120 to the destination equipment 118. Each of the optical signals not being dropped at a particular CO 101a–c can be amplified and passed along to the next CO.

FIG. 3 shows a more detailed diagram of a CO 130 in a ring architecture. A CO 132 transmits over a path 134 a plurality of optical signals as a wavelength division multiplexed optical signal with wavelengths $\lambda_1 \ldots \lambda_n$. Instead of using spatial multiplexing where one wavelength is in each fiber, wavelength division multiplexing (WDM) can increase capacity or decrease costs because multiple wavelengths can be put on a single fiber. The optical signal is received by the CO 130, and a pre-amplifier 138 might be used to amplify the optical signal. In particular, an erbium-doped fiber amplifier (EDFA) can be used to simultaneously amplify all of the optical signals having a plurality of wavelengths in a linear fashion. In this particular embodiment, an add/drop multiplexer 140 receives the optical signal. The add/drop multiplexer 140 includes wavelength selection devices 142 and 144, such as a wavelength grating routers (WGRs). An example of a WGR is disclosed in "Integrated Optics N×N Multiplexer On Silicon", Dragone et al., IEEE Phot. Technol. Lett., Vol. 3, pages 896–899 (1991).

The WGR 142 routes the incoming optical signals as a function of wavelength, to a particular output port of the WGR 142. For example, an optical signal at a wavelength of $\lambda_1$ applied over the path 134 to WGR 142 is routed by the WGR 142 to path 146. Moreover, an optical signal at a wavelength of $\lambda_2$ applied over the path 134 to the WGR 142 is routed by the WGR 142 to path 148. Optical signals having particular wavelengths can be "dropped" by the WGR 142. In this particular example, an optical signal having a particular wavelength $\lambda_n$ is routed onto path 150 by the WGR 142 and thereby dropped to terminal equipment 152. The terminal equipment 152 includes a receiver 156 that receives the optical signal from the path 150 and converts the optical signal to an electrical signal, thereby terminating the optical path for that particular wavelength. The receiver 156 outputs the electrical signal to electrical circuitry 158 for routing the electrical signal to the proper destination equipment 160. The electrical circuitry 158 can include a host digital terminal, switches and other electronic processors and circuitry. The destination equipment 160 can include subscriber telephones 162a–b, remote terminal equipment 164 connected to subscriber telephones 162c–d, or other local data networks.

If a call is placed by a subscriber telephone 162a, the electrical signal representing the call passes over path 166 to the CO 130. At the CO 130, the electrical circuitry 158 processes the call and sends the electrical signal to transmitter 170. The transmitter 170 outputs an optical signal having the wavelength $\lambda_n$ by using the electrical signal to modulate a laser that can produce light having the wavelength $\lambda_n$. The transmitter 170 transmits the optical signal via path 172 to WGR 144, which multiplexes the optical signal onto the wavelength division multiplexed signal on path 174. On the path 174, the optical signal can be amplified by amplifier 176, such as an EDFA, before being output from the CO 130.

In current ring architectures, optical fibers corresponding to optical signals dropped at an add/drop multiplexer on the ring terminate at the add/drop multiplexer. For example, in FIG. 3, if an optical signal having wavelength $\lambda_n$ is dropped at the add/drop multiplexer 140, the optical fiber terminates at the terminal equipment 152 where the optical signal is converted to an electrical signal. For the add/drop multiplexer 140 to add the optical signal from the path 172 onto the path 174, the transmitter 170 must provide light having wavelength $\lambda_n$ from an optical source. As such, a relatively costly and accurately tuned laser and its supporting electronics is used for each wavelength of optical signals dropped at each add/drop node on the ring. Thus, current ring architectures can be costly and inflexible.

Accordingly, a node configuration is needed for a more flexible ring architecture which reduces costs associated with current ring architectures.

SUMMARY OF THE INVENTION

The present invention relates to an optical node system for an optical ring network that reduces certain costs associated with current ring architectures by using at least a portion of the light from an incoming optical signal to transmit an outgoing optical signal.

In accordance with certain embodiments, the node includes an add/drop multiplexer which receives optical signals having a plurality of wavelengths. The add/drop multiplexer can be configured to output optical signals having certain wavelengths and to route at least one optical signal from the ring of at least one particular wavelength (or wavelength band) to a corresponding optical transceiver. The optical transceiver receives the incoming optical signal of the particular wavelength from the add/drop multiplexer and transmits an outgoing optical signal at the particular wavelength with at least a portion of the light from the incoming optical signal. The optical transceiver can modulate outgoing information onto the light of the incoming optical signal and/or pass at least a portion of the incoming optical signal with incoming information for transmission as the outgoing optical signal onto the optical ring network. Thus, the optical node system alleviates the need for nodes to have a laser tuned to the particular wavelength for transmitting an outgoing optical signal at the particular wavelength.

BRIEF DESCRIPTION OF THE DRAWING

Other aspects and advantages of the present invention may become apparent upon reading the following detailed description and upon reference to the drawings in which.

DETAILED DESCRIPTION

Illustrative embodiments of the optical node system according to the principles of the present invention are described below as the node might be implemented to reduce costs and enhance performance associated with current ring architectures by using at least a portion of the light from an incoming optical signal to transmit an outgoing optical signal.

In accordance with certain embodiments, the optical node system includes an add/drop multiplexer which receives optical signals having a plurality of wavelengths, outputs optical signals having a subset of those wavelengths, and routes at least one optical signal from the ring of at least one particular wavelength (or wavelength band) to an optical transceiver. The optical transceiver transmits an outgoing optical signal at the particular wavelength with at least a portion of the light from the incoming optical signal. The optical transceiver can suppress incoming information on the incoming optical signal if any and modulate outgoing information onto the light of the incoming optical signal. Additionally, the optical transceiver can pass at least a portion of the incoming optical signal with incoming information for transmission as the outgoing optical signal onto the optical ring network. Furthermore, the optical node system can provide non-terminating (i.e., not completely ending at an electrical path) optical paths for certain wavelengths throughout the ring, thereby reducing the need for optical sources producing light at those wavelengths at the nodes along the ring.

Figure 1:
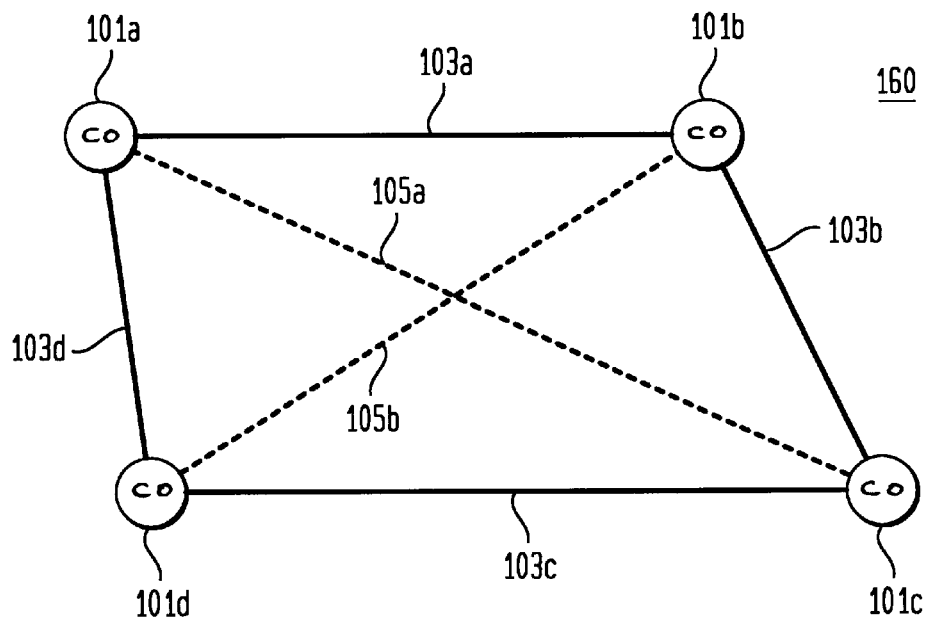
FIG. 1 depicts a typical telecommunications ring architecture.
Figure 2:
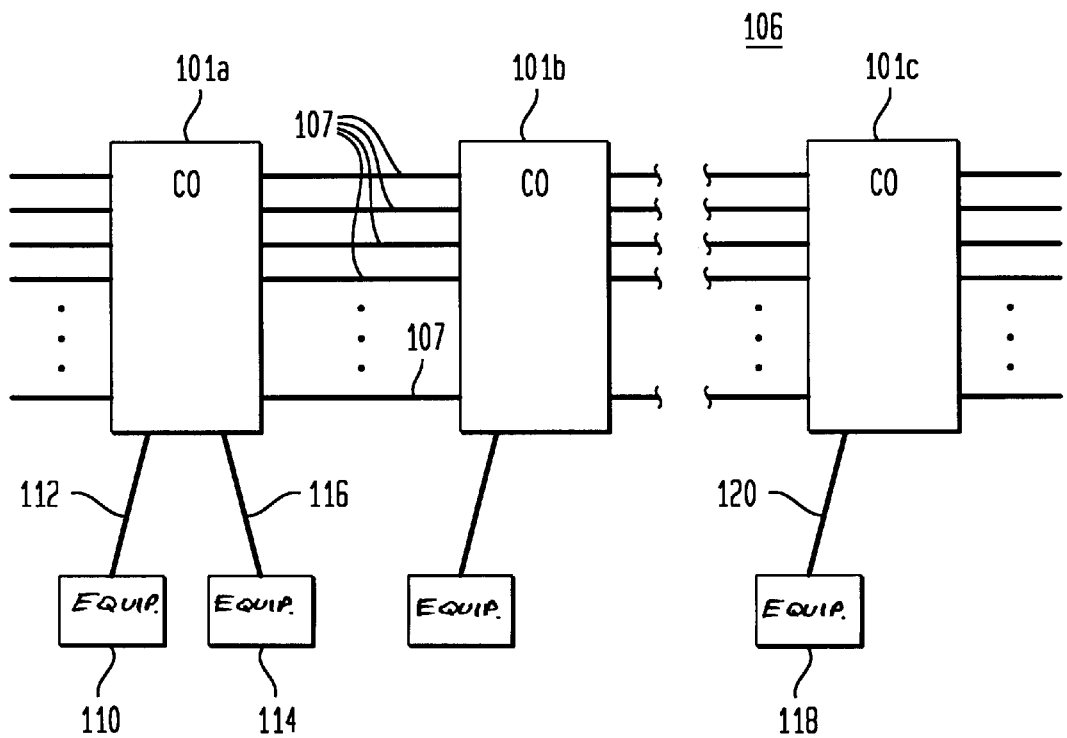
FIG. 2 depicts in block diagram form a typical add/drop scheme in a ring architecture.
Figure 3:
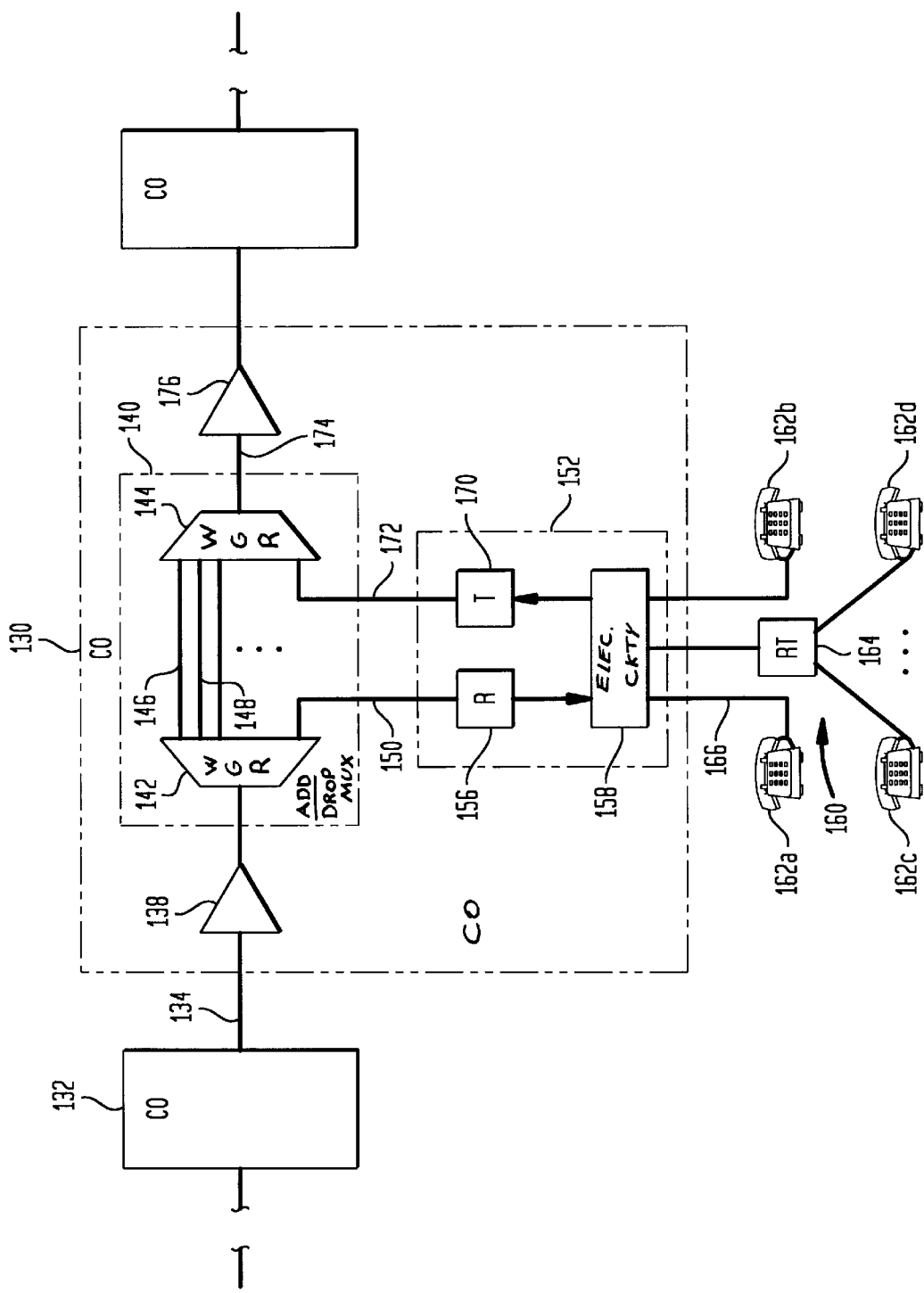
FIG. 3 depicts a typical optical add/drop node in a ring architecture.
Figure 4:
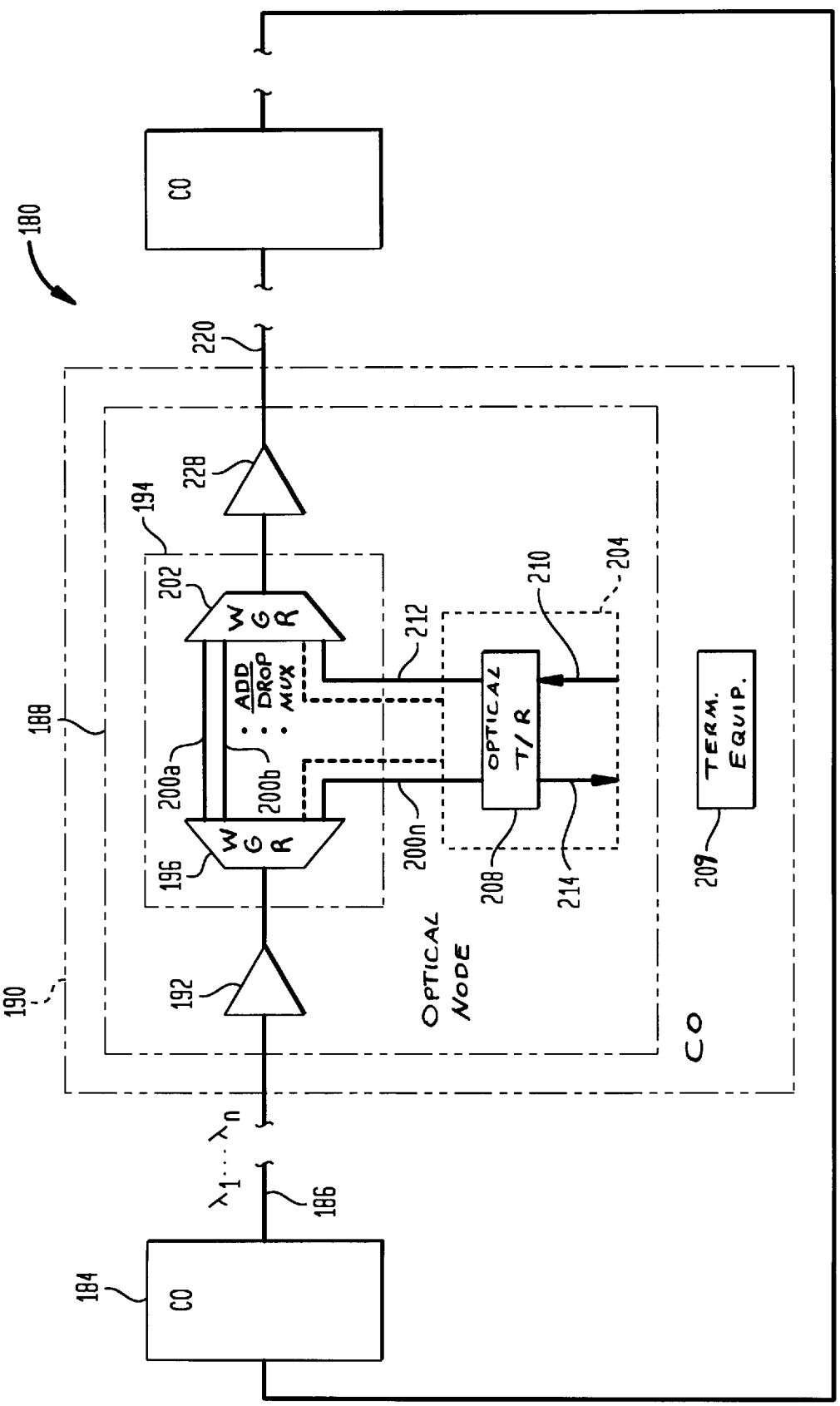
FIG. 4 shows a optical node configuration for a ring architecture according to the principles of the present invention.

FIG. 4 shows an optical node/ring configuration according to the principles of the present invention. A CO 184 provides optical signal having a plurality of wavelengths $\lambda_1 \ldots \lambda_n$ along optical fiber path 186 to an add/drop node 188. The add/drop node 188 is representative of one of a number of nodes that can form the ring 180. The node 188 may or may not be part of a CO 190 shown in dashed lines. At the node 188, the optical signals on path 186 are amplified by pre-amplifier 192 (optional). In this particular embodiment, an optical add/drop multiplexer 194 uses wavelength selection devices, such as WGR 196 to divide the optical signals by wavelength onto paths 200a–200n, several of which are directed to a WGR 202. The add/drop multiplexer 194 also drops one or more of the paths 200 to optical transceiver circuitry 204, which can include one or more optical transceivers corresponding to particular wavelengths (or wavelength bands).

In this particular embodiment, an optical transceiver 208 receives an incoming optical signal of a particular wavelength (or wavelength bands) from the path 200n. If incoming user information intended for dropping at the node 188 is modulated onto the optical signal, the optical transceiver 208 can retrieve the downstream user information onto the path 214 to terminal equipment 209. The optical transceiver 208 outputs an outgoing optical signal at the particular wavelength onto path 212 to the WGR 202 from at least a portion of the light from the received optical signals. In doing so, the optical transceiver 208 can receive an optical signal at the particular wavelength and modulate upstream user information provided by the terminal equipment 209 on line 210 onto the light of the optical signals for transmission. The optical transceiver 208 can also output incoming optical signals bearing information intended for other nodes without modulating upstream user information onto the incoming optical signals. Depending on the particular embodiment, the optical transceiver 208 can modulate the portion of light from incoming optical signals bearing information after the information on the light is suppressed.

The terminal equipment 209 can include processing circuitry to provide control signals to the optical transceiver circuitry 204 depending on the design and/or the optical signal. For example, incoming user information destined for multiple locations could be treated differently by the optical transceiver, and/or downstream control information could control the receiving of downstream user information and the modulating of outgoing user information by the optical transceiver 208. As such, the optical transceiver 208 may or may not retrieve incoming user information and may or may not modulate outgoing user information onto the optical signal depending on the design and/or the type of information in the optical signal. At the add/drop multiplexer 194, the WGR 202 combines the optical signal of the particular wavelength with the optical signals at the other inputs of WGR 202 to form a WDM signal on path 220. An amplifier 222, such as an EDFA, can be used to amplify the optical signals comprising the WDM signal.

The optical transceiver 208 can be configured in various ways to maintain light of a particular wavelength flowing through the ring without the need for an optical source tuned to the particular wavelength at every node where that wavelength is dropped. The optical transceiver accomplishes this by receiving at least one incoming optical signal of at least one particular wavelength and using at least a portion of the light from the incoming optical signal for transmission. The optical transceiver can output an outgoing optical signal using the same incoming optical signal or an optical signal of the same wavelength from at least a portion of the light of the incoming optical signal which has been altered and/or modulated with outgoing user information. As such, the node according to the principles of the present invention enables a ring architecture with continuous or nonterminating. optical paths (i.e., optical paths do not end at an electrical path) of particular wavelengths. Such an optical ring architecture resulting from the optical node system provides a cost incentive for using optical local loops or optical distribution systems by reducing the need and costs associated with conventional electrical terminal equipment or optical/electrical conversion equipment. An optical local loop system is disclosed in U.S. Pat. No. 5,559,624 to Darcie et al, herein incorporated by reference.

Figure 5:
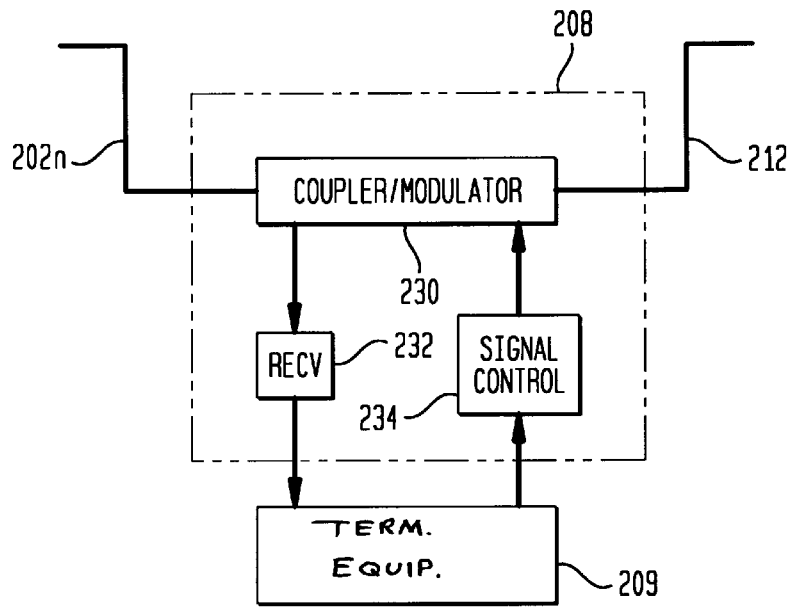
FIG. 5 shows a block diagram of an optical transceiver for a node according to the principles of the present invention.

FIG. 5 shows a block diagram of an embodiment of the an optical transceiver 208 for use in a node configuration according to the principles of the present invention. In one version of this particular embodiment, an incoming optical signal at a particular wavelength on the path 202n includes information intervals or "blank optical chalkboard" intervals or portions, the light of which is used as a carrier for outgoing information. In general, the blank optical chalkboard refers to an incoming optical signal with no incoming information. The optical transceiver 208 receives the incoming optical signal, and during the data or incoming information intervals of the incoming optical signal, the coupler/modulator 230 couples the incoming optical signals to a receiver 232. The receiver 232 receives the incoming optical signals and extracts modulated data from the optical signals when there is incoming information to be dropped. In one particular embodiment, the receiver 232 converts the modulated data into electrical data signals which are provided to the terminal equipment 209. In such an embodiment, the receiver 232 can employ any well known type of optical receiver capable of receiving the optical signal from path 202n and converting it to an electrical signal.

The coupler/modulator 230 can also route the incoming optical signal towards the path 212. In one particular embodiment, during the optical chalkboard intervals of the optical signal, the coupler/modulator 230 modulates outgoing user information from the terminal equipment 209 onto the light of the incoming optical signal according to signal and control circuitry 234. As such, the coupler/modulator 230 obtains optical signals having a particular wavelength and modulates outgoing information onto at least a portion of the light from the incoming optical signals for transmission as outgoing optical signals onto the path 212.

Alternative embodiments for the optical transceiver and node configuration are possible. For example, in one version, the coupler/modulator 230 routes all of the incoming optical signals to the receiver 232 during the data interval of the optical signal as controlled by the signal and control circuitry 234. During the optical chalkboard interval, the coupler/modulator 230 routes all of the incoming optical signals towards the path 212, and the coupler/modulator 230 modulates outgoing information onto the optical signal for transmission onto the path 212. As such, the signal and control circuitry 234 receives information from the terminal equipment 209 as to when the incoming optical signal includes incoming data or information to be dropped and when the optical signal includes the optical chalkboard for modulation of outgoing information, which could be identical to the incoming user information.

Figure 6:
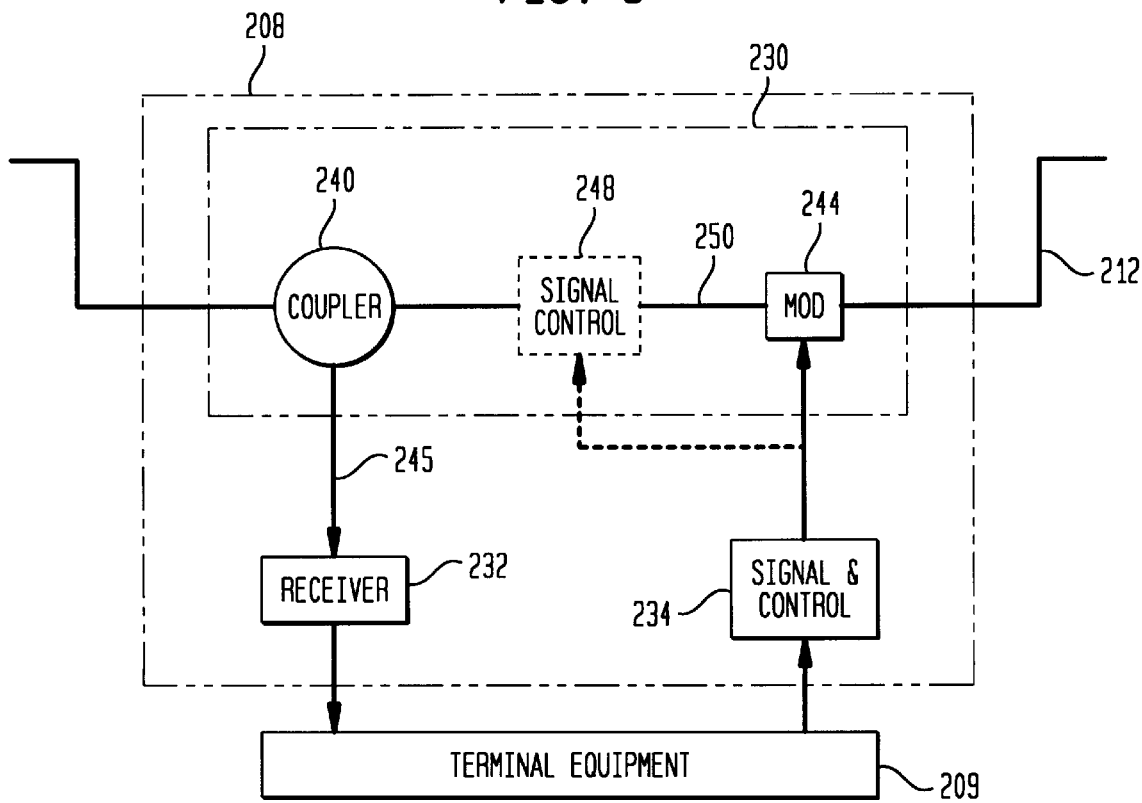
FIG. 6 depicts an embodiment of the optical transceiver used in a node according to the principles of the present invention.

FIG. 6 shows another version of the optical transceiver 208. The coupler/modulator 230 includes a coupler 240. The coupler 240 routes at least a portion of the downstream optical signal (for example, 10%) to the receiver 232 and the remaining portion (for example, 90%) is coupled on a path 250 to a modulator 244. In this particular embodiment, the receiver 232 extracts the incoming information from the portion of the incoming optical signal which is coupled onto the path 245 by the coupler 240. Depending on the particular embodiment and the electrical signals provided by the signal and control circuitry 234, the remaining portion of the optical signal can be either passed on to the path 212 without modulation, or if the transmission of outgoing information is desired, the modulator 244 modulates the remaining portion of the incoming optical signal with the outgoing information to form the outgoing optical signal. The outgoing optical signal can be amplified with optional amplifier 222 (FIG. 4) if necessary.

Thus, this embodiment enables incoming data to be obtained by the receiver 232 while providing an optical signal at a particular wavelength for modulation and/or transmission without delay. If the incoming optical signal is to be forwarded to other destinations, the signal and control circuitry 234 can provide control signals to the modulator 244 and to signal conditioning circuitry 248 (optional, depending on the embodiment) so that the incoming optical signal is not altered. As such, the incoming optical signal can continue flowing on the ring without interruption. In certain embodiments, if at least a portion of the incoming optical signal which has been modulated with incoming user information on the path 250 is to be used for modulation and transmission of outgoing user information, the signal and control circuitry 234 provides control signals to the signal conditioning circuitry 248.

In certain embodiments, the signal conditioning circuitry 248 effectively counteracts, removes, suppresses and/or attenuates the modulated portion of the incoming optical signal. In this particular embodiment, the signal conditioning circuit 248 includes a series of optical amplifiers (not shown) operating in saturation as will be discussed below. The signal conditioning circuitry 248 outputs a relatively unmodulated optical signal of the particular wavelength on the path 250 to the modulator 244. If the incoming optical signal includes an optical chalkboard interval or if other nodes on the ring are to receive the incoming information dropped at the receiver 232, the signal conditioning of the incoming optical signal may not be necessary, and the incoming optical signal could be provided directly to the modulator 244. The optical transceiver 208 can determine the presence of a blank optical chalkboard interval by receiving incoming information to signal the start of the blank optical chalkboard. The modulator 244 modulates the optical signal on the path 250 with outgoing user information as provided and controlled by the signal and control circuitry 234. In this description, modulation can include gain. The modulator 244 can include a LiNbO$_3$ modulator manufactured by Lucent Technologies, Inc., Murray Hill, N. J., for example. The modulator 244 transmits the outgoing modulated optical signals along the path 212 at the appropriate wavelength for the WGR 202 (FIG. 4) to be combined with the other optical signals on the path 220 (FIG. 4).

Figure 7:
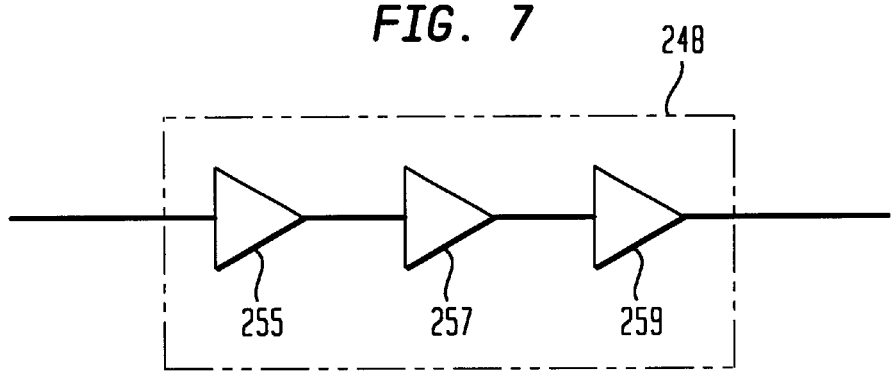
FIG. 7 shows signal conditioning circuitry for certain embodiments of the optical transceiver of the node according to the principles of the present invention.

In certain embodiments such as those embodiments where the incoming optical signal having incoming information to be dropped is also to be used for modulation and transmission of outgoing user information, the signal conditioning circuitry 248 can be used to suppress the modulated portion of the incoming optical signal. FIG. 7 shows an embodiment of signal conditioning circuitry 248. In this particular embodiment, the signal conditioning circuitry 248 includes a plurality of optical signal amplifier circuits 255, 257 and 259 connected in series. In this particular embodiment, the amplifier circuits 255, 257 and 259 can operate in their saturation range. When operating in the saturation range, each amplifier stage of the signal conditioning circuit 248 attenuates the modulated portion of the incoming optical signal. Alternatively, feed forward techniques could be used to control the gains of the amplifier circuits 255, 257 and 259. Such techniques may require that some level of light be present at all time (i.e. contrast ratio <1).

FIGS. 8a–8d show how one embodiment of the signal conditioning circuitry 248 suppresses the modulated portion of the incoming optical signal at each amplifier stage.

Figure 8A:
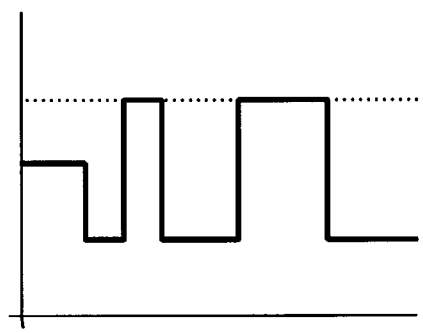
FIGS. 8A–8D depict examples of waveforms appearing at various points in the signal conditioning circuit depicted in FIG. 7.
Figure 8B:
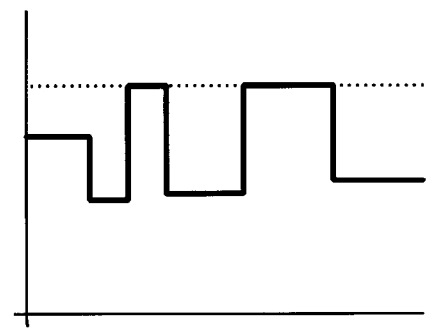
Figure 8C:
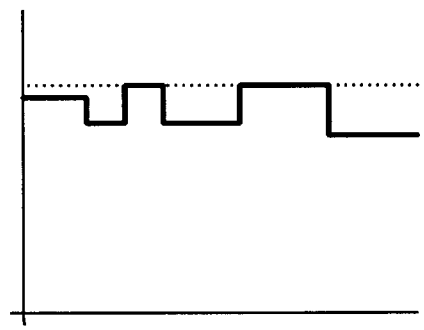
Figure 8D:
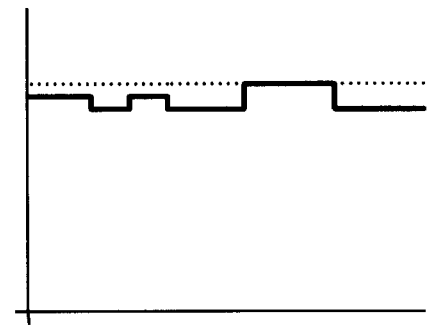

FIG. 8a shows the incoming optical signal modulated with incoming information at the input to the signal conditioning circuitry 248. FIG. 8b shows the incoming optical signal being suppressed after passing through the amplifier circuit 255, and FIG. 8c shows the incoming optical signal being further suppressed after passing through the amplifier circuit 257. Finally, FIG. 8d shows the incoming optical signal after passing through the amplifier circuit 259. By providing several stages of optical amplifiers operating in saturation, it is possible to suppress or effectively remove the modulated portion of the incoming optical signal. Of course, the optical signal can be passed through more or fewer optical amplifiers, as necessary, to remove as much of the modulated portion of the signal as desired. For example, it may be possible to sufficiently suppress the modulated portion of the optical signal using only one or two optical amplifiers. On the other hand, it may be desirable to more gradually suppress the optical signal using more than three optical amplifiers. Alternatively, depending on the application, the signal conditioning circuitry 248 can be configured so that control signals can enable/disable the signal conditioning circuitry 248 or change the operation of the amplifier circuits 255, 257 and 259. For example, depending on the embodiment and/or the incoming optical signal, the amplifier circuits could be designed to operate in saturation or not.

Accordingly, the present invention provides a system that obviates the need for providing individual laser light sources for each wavelength dropped or routed within each node to the optical transceiver according to the principles of the present invention, thus simplifying the structure, reducing overall cost and reducing the amount of maintenance of the entire ring architecture. In certain embodiments, the periodic properties of the WGR can be used to allow light of additional wavelengths spaced by multiples of the free spectral range (FSR) to be used without additional optical circuitry, thereby providing flexibility and the potential for increased capacity. For example, a WGR could route optical signals having wavelengths of $\lambda_1$ and $\lambda_{n+1}$ together as well as $\lambda_2$ and $\lambda_{n+2}$ together and so on. Additionally, the node configuration according to the principles of the present invention can quite efficiently accommodate optical distribution systems, thereby further reducing costs by alleviating the need for electrical terminal equipment.

Alternative configurations of the node configuration according to the principles of the present invention are possible which omit or add components, use different schemes depending upon the type of incoming optical signals or control information in the incoming optical signals and/or perform variations of the above-described optical transceiver and control thereof. Other alternative embodiments can be used which are encompassed by the principles of the present invention to provide continuous paths for certain wavelengths of optical signals to reduce the need for optical sources producing light at those wavelengths in a ring architecture.

Figure 9:
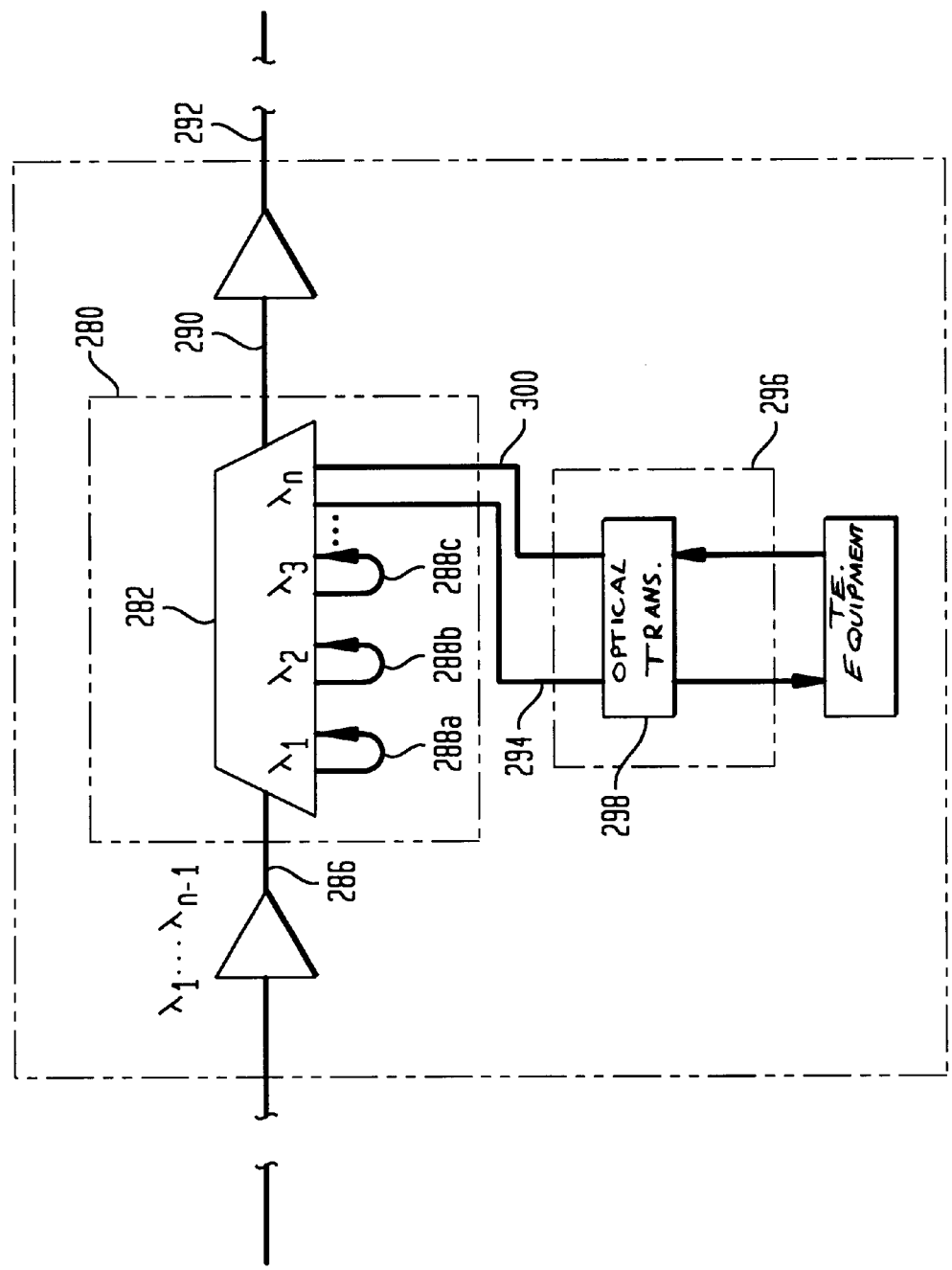
FIG. 9 shows an alternative embodiment for an optical multiplexer used with the optical node system according to the principles of the present invention.

Furthermore, the node configuration has been described as being comprised of several simple components, but it should be understood that the node configuration and portions thereof can be employed using other forms of wavelength selection devices, add/drop multiplexers and variations in the configuration of the optical transceiver. For example, FIG. 9 shows an alternative embodiment for the optical node system which uses a different configuration for the optical add/drop multiplexer 280 than was used for the add/drop multiplexer 194 (FIG. 4). The add/drop multiplexer 280 includes a single wavelength selection device, such as a 2×2n WGR 282 which is shown having twice as many output ports when compared to a previous WGR described above. The WGR 282 receives optical signals having a plurality of wavelengths $\lambda_1 .. \lambda_n$ from the line 286. In this particular embodiment, by coupling pairs 288a–c of ports together in a variety of schemes taking into account channel spacing and interference, optical signals having certain wavelengths $\lambda_1 .. \lambda_3$ are output onto line 290 for transmission onto the ring 292. In this particular embodiment, incoming optical signals having a wavelength $\lambda_n$ are routed over line 294 to optical transceiver circuitry 296 which includes optical transceiver 298. The optical transceiver 298 uses at least a portion of the light from the incoming optical signal to output an outgoing optical signal having the wavelength $\lambda_n$ onto line 300 to the WGR 282. The WGR 282 outputs the outgoing optical signal onto line 290 for transmission over the ring 292.

The optical ring network architecture of the central offices described above which employs the optical node system according to the principles of the present invention is merely illustrative, and the node configuration can be used in other optical ring architectures. Additionally, the node configuration according to the principles of the present invention can be implemented utilizing various combinations of application specific, optical and opto-electronic integrated circuits, software driven processing circuitry, or other arrangements of discrete components. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

What is claimed is:

1. An optical network formed by at least two optical nodes for transferring optical signals along said optical network, said network comprising:

a first node comprising a first optical multiplexer configured to receive optical signals having at least a first wavelength, said optical multiplexer further configured to output optical signals having at least said first wavelength to at least a second node along said optical network and to route at least one incoming optical signal having said first wavelength modulated with incoming user information to an optical transceiver; and said optical transceiver coupled to said first optical multiplexer and configured to receive said at least one incoming optical signal and to output at least a portion of the light of said incoming optical signal to provide an outgoing optical signal; and a second node comprising a second optical multiplexer configured to receive at least said outgoing optical signal from said first node of said first wavelength and to route at least said received outgoing optical signal at said first wavelength to a second optical transceiver, said second optical transceiver coupled to said second optical multiplexer and configured to receive at least said received outgoing optical signal and to output at least a portion of the light of said received outgoing optical signal of said first wavelength to said second optical multiplexer to provide a second outgoing optical signal at said first wavelength along said optical network.

2. The optical network of claim 1 wherein said first optical transceiver modulates outgoing user information onto at least a portion of the light of said incoming optical signal.

3. The optical network of claim 2 wherein said optical transceiver includes:

signal conditioning circuitry configured to receive said incoming optical signal having said first wavelength which has been modulated with incoming user information and to suppress said incoming user information modulated on said at least a portion of the light from said incoming optical signal.

4. The optical network of claim 3 wherein said first optical transceiver is configured to modulate said at least a portion of the light from said incoming optical signal with outgoing user information after said incoming optical signal having incoming user information suppressed by said signal conditioning circuitry.

5. The optical network of claim 3 wherein said signal conditioning circuitry substantially removes a modulated portion of said incoming optical signal modulated with incoming user information.

6. The optical network of claim 3 wherein said signal conditioning circuitry comprises at least one optical amplifier.

7. The optical network of claim 6 wherein said at least one optical signal amplifier operates in saturation.

8. The optical network of claim 1 wherein said optical multiplexer includes a first wavelength selection device coupled to a second wavelength selection device and is configured to receive said optical signals having certain wavelengths and said outgoing optical signal and to combine said optical signals having certain wavelengths and said outgoing optical signal from said first optical transceiver onto an optical output path.

9. The optical network of claim 8 wherein said first and second wavelength selection devices are on the same physical device.

10. The optical network of claim 1 wherein said second optical transceiver modulates second outgoing user information onto at least a portion of the light of said received outgoing optical signal at said first wavelength.

11. The optical network of claim 1 wherein said second optical transceiver receives incoming user information modulated on said received outgoing optical signal at said first wavelength.

12. A method of transferring optical signals in an optical network formed by at least two nodes, said method comprising the steps of:

receiving by a first node optical signals having at least a first wavelength from said optical ring network;

routing at least one incoming optical signal having said at least first wavelength modulated with incoming user information to a first optical transceiver; and outputting by said first optical transceiver at least a portion of light from said incoming optical signal to provide an outgoing optical signal having said first wavelength for transfer to at least a second node on said optical network;

outputting by said first node said outgoing optical signal having said first wavelength;

receiving by a second node at least said outgoing optical signal;

routing at least said received outgoing optical signal at said first wavelength to a second optical transceiver;

providing by said second optical transceiver at least a portion of light from said received outgoing optical signal as a second outgoing optical signal at said first wavelength; and outputting said second optical signal at said first wavelength along said optical network.

13. The method of claim 12 further including the step of:

modulating outgoing user information onto at least a portion of the light of said incoming optical signal.

14. The method of claim 13 further including the steps of:

receiving said incoming optical signal which has been modulated with said incoming user information; and suppressing said incoming user information of said incoming optical signal.

15. The method of claim 14 further includes:

modulating said incoming optical signal having incoming user information suppressed by signal conditioning circuitry with said outgoing user information.

16. The method of claim 14 wherein said step of suppressing further includes:

substantially removing said incoming user information from said incoming optical signal which has been modulated with said incoming user information.

17. The method of claim 14 wherein said step of suppressing includes the step of:

using at least one optical amplifier.

18. The method of claim 17 wherein said step of using includes:

operating said at least one amplifier in saturation.

19. The method of claim 12 further including the step of:

combining said optical signals having certain wavelengths and said outgoing optical signal from said optical transceiver onto an optical output path.

20. The method of claim 12 further including:

modulating by said second optical transceiver second outgoing user information onto at least a portion of the light of said received outgoing optical signal.

21. The method of claim 12 further including:

receiving by said second optical transceiver incoming user information modulated on said received outgoing optical signal.

* * * * *